UNITED STATES PATENT OFFICE 2,606,183

PREPARATION OF AROMATIC DIAZONIUM FLUOBORATE

James D. Head and Frederick J. Lowes, Midland, Mich., assignors to The Dow Chemical Company, Midland, Mich., a corporation of Delaware No Drawing. Application October 3, 1949, Serial No. 119,393

3 Claims. (Cl. 260—141)

This invention relates to the preparation of fluoro-substituted aromatic compounds, and, more particularly, to an improvement in a method for producing such materials.

Aromatic fluoro compounds have been produced by the Balz-Schiemann reaction (Berichte, vol. 60, p. 1186 et seq. (1927)), sometimes called the Schiemann reaction. According to this reaction a primary aromatic amine is converted to the corresponding fluoride by three separate steps: (1) diazotizing the amine hydrochloride by means of sodium nitrite and hydrochloric acid to produce a diazonium chloride; (2) converting the diazonium chloride to the diazonium fluoborate by the action of fluoboric acid; and (3) thermally decomposing the diazonium fluoborate to the corresponding fluoride. Diazotization is carried out in a solvent that comprises hydrochloric acid. The reactions which are believed to proceed in the course of the overall process are illustrated by Equations 1, 2 and 3, below, (1) $RNH_3Cl + NaNO_2 + HCl \rightarrow RN_2Cl + 2H_2O + NaCl$ 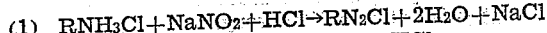
(2) $RN_2Cl + HBF_4 \rightarrow RN_2BF_4 + HCl$ 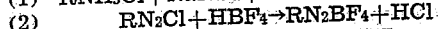
(3) $RN_2BF_4 \rightarrow RF + N_2 + BF_3$ 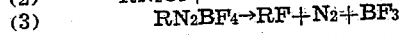

in which R is an aromatic radical. This general method is applicable to the preparation of fluoro-substituted aromatic compounds useful as intermediates for the production of oxygen-carrying chelates.

Of like utility is a known improvement on the Balz-Schiemann reaction in which the diazotization is carried out in a solvent comprising fluoboric acid (see Organic Syntheses, vol. XIX, p. 40). When the diazotization is conducted in this way, the desired diazonium fluoborate is produced directly from the amine reactant in a single step. The reaction which is believed to occur is illustrated by Equation 4, below, (4) $RNH_2 + NaNO_2 + 2HBF_4 \rightarrow$
$RN_2BF_4 + NaBF_4 + 2H_2O$ 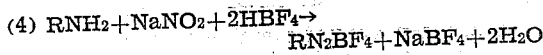

in which R is an aromatic radical.

The present invention is based upon the discovery of a further improved way of producing a diazonium fluoborate which results in a substantially better yield of the aromatic fluoride after decomposition than is possible with either of the prior processes. This further improvement is applicable whether the diazotization solvent is an aqueous solution comprising hydrochloric acid (original Balz-Schiemann reaction) or an aqueous solution comprising fluoboric acid (improved method shown in Organic Syntheses).

In accordance with the invention, an excess of HF (i. e., more than four mols of HF per mol of boric acid) is provided in the fluoboric acid solution used to form the diazonium fluoborate (i. e., the fluoboric acid solution used to convert the diazonium chloride to diazonium fluoborate when hydrochloric acid is the diazotization solvent, or the fluoboric acid solution used as the diazotization solvent).

A preferred embodiment of the invention involves using an aqueous solution that comprises fluoboric acid and excess HF as solvent for conducting the diazotization reaction. This embodiment is preferred because it accomplishes a substantially greater conversion of the amine to the fluoride (based upon the fluoboric acid consumed). Even a slight excess of HF in the fluoboric acid used to form the diazonium fluoborate results in a substantially improved yield of the aromatic fluoride. In order to realize the maximum benefit from the use of excess HF it is usually preferred to use a sufficient excess of HF that the molar ratio of HF to boric acid (used to prepare the fluoboric acid) be at least 4.1:1, and most preferred to use a sufficient excess that it be at least 4.2:1; there is no reason for the ratio to be more than 5:1.

Although the invention is not limited to the following theoretical explanation, it is believed that the substantially improved yields achieved from the method of the invention indicate that an equilibrium prevails in a fluoboric acid solution, and that the presence of an excess of HF drives this equilibrium in a direction that favors the formation of the desired product. A possible equilibrium, the existence of which could interfere with the formation of the desired product, is illustrated by Equation 5, below, (5) $HBF_4 + H_2O \rightarrow HBF_3OH + HF$ 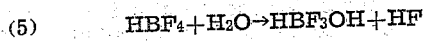

It is thought that such an equilibrium prevails between fluoboric acid and water, and that $HBF_3OH$ forms diazonium salts ($R-N_2BF_3OH$) which do not undergo thermal decomposition to form the corresponding fluorides.

In general, any primary aromatic amine can be converted to the corresponding fluoride according to the improved methods of the invention. Secondary and tertiary amines are not applicable because they do not undergo diazotization. Although certain radicals attached as substituents to the aromatic nucleus tend to interfere with the diazotization, a better yield results from the improved method even though the aromatic amines include interfering substituents. Examples of such interfering substituents include —OH, —SO₃H, —NO₂, and —COOH. Accordingly, it is usually preferred to produce diazonium fluoborates from primary amines which are not substituted by any of the aforementioned radicals, although the invention is not limited to the use of aromatic amines having no such substituents. Halo, alkyl and alkoxy substituents in no way interfere with the diazotization and formation of the diazonium fluoborate; furthermore, primary amines including such radicals yield fluoro-substituted aromatic compounds having particular utility for the production of oxygen-carrying chelates (see J. Am. Chem. Soc., vol. 68, page 2254 et seq.). Accordingly, the use of a primary aromatic amine whose molecular structure includes a halo, an alkyl or an alkoxy substituent is a preferred embodiment of the invention. The most preferred embodiment involves the use of a primary aromatic amine whose molecular structure includes all three of these substituents (i. e., halo, alkyl and alkoxy). The halo substituents can be fluoro, chloro, bromo or iodo. The alkyl substituent, or the alkyl part of the alkoxy substituent, can be primary, secondary or tertiary; the number of carbon atoms is limited only by practical considerations, which usually make it desirable that the alkyl or alkoxy radicals have not more than about sixteen carbon atoms, that the aromatic nucleus be a phenyl or naphthyl ring, and that there be not more than five substituents, other than amino, attached to the aromatic nucleus.

In effecting diazotization of a primary amine according to the invention, it has been found advantageous to use an approximately equimolecular amount of a nitrite, any excess being of the nitrite. About a five per cent excess of the nitrite is ordinarily most desirable. The diazotization is preferably conducted at a temperature between about 0° C. and about —10° C., although higher temperatures, e. g., as high as about 25° C., can be used; however, a lower yield of the diazonium fluoborate ordinarily results when the reaction is conducted at a temperature higher than about 0° C. Cooling is conveniently effected by means of a refrigerant or with Dry Ice, which also provides an inert gas ($CO_2$) atmosphere which is desirable during diazotization in an open vessel. The nitrites that are used are ordinarily alkali metal nitrites because of their solubility in the aqueous diazotization solutions.

Diazotization is conveniently effected by dissolving the primary aromatic amine in the diazotization solvent (i. e., either aqueous hydrochloric acid or aqueous fluoboric acid) and adding the nitrite to the resulting solution. Stirring of the medium during the addition of the nitrite substantially increases the yield. Diazotization proceeds readily, and it is ordinarily desirable that the nitrite be added comparatively rapidly. However, if the rate of nitrite addition is too high, NO₂ is released from the diazotization mixture by undesirable side reaction. Accordingly, the nitrite is ordinarily added at a rate just lower than that at which NO₂ evolution occurs (e. g., in about 30 minutes if the diazotization temperature is —10° C., or in about 60 minutes if the diazotization temperature is approximately 0° C.). While the nitrite is conveniently added to the diazotization mixture as an aqueous solution, the introduction of unnecessary water into the reaction vessel is usually avoided by employing a nitrite solution that is approximately saturated. When the nitrite addition is complete, the diazotization mixture is preferably warmed to a temperature between about 20° C. and about 30° C. in order to assure completion of the reaction.

It is usually desirable that the molar ratio of fluoboric acid to aromatic amine be from about 1:1 to about 4:1. It is most desirable that the molar ratio of fluoboric acid to aromatic amine be about 2:1 to 3:1. The preferred ratios of fluoboric acid to aromatic amine are a compromise, because a low ratio of fluoboric acid to aromatic amine results in incomplete precipitation of the diazonium fluoborate, and too high a ratio makes recovery of the excess fluoboric acid unreasonably difficult.

When the diazotization is carried out in a solvent that comprises fluoboric acid, formation of the diazonium fluoborate takes place at the same time that the diazotization reaction occurs, and the temperature at which the diazonium fluoborate is formed is the temperature at which the diazotization is carried out. When the diazotization is carried out in an aqueous hydrochloric acid solution the diazonium fluoborate is formed by subsequent additions of fluoboric acid and excess HF. Since, as is indicated above, the diazotization product has usually been warmed to a temperature between about 20° C. and about 30° C., the fluoboric acid and excess HF are conveniently added to the warm solution with further cooling only to keep the temperature thereof from exceeding 30° C.

After the diazonium fluoborate has been formed, it is separated from the reaction solution, e. g., by filtration or by centrifuging. Because the diazonium fluoborate is substantially soluble in the warm reaction solution, it is usually desirable that the entire mixture be cooled to reduce the solubility of the fluoborate before the separation is accomplished. Ordinarily cooling to temperatures of from about —20° C. to about —30° C. is satisfactory.

Following separation the diazonium fluoborate may advantageously be washed with an organic material such as ethylene dichloride. The washed material is then dried, in air alone or in a vacuum. It is extremely important that all moisture be separated from the diazonium fluoborate before thermal decomposition is effected; even a comparatively small amount of moisture interferes substantially with decomposition and greatly reduces the yield of the final fluoride. The thermal decomposition is effected by the usual methods (e. g., those disclosed by Balz and Schiemann).

The following examples illustrate the new process, but are not to be construed as limiting the scope of the invention.

EXAMPLE 1

A primary aromatic amine was converted to the corresponding fluoride according to the following procedure:

Aniline (93 grams) and an aqueous solution of fluoboric acid produced from hydrofluoric acid (442 grams of an aqueous solution containing 60 per cent of HF), boric acid (185 grams) and water (200 grams) were added to a copper beaker equipped with a motor driven stirrer fitted with copper paddles. The acid solution comprised fluoboric acid and excess HF in such proportion that the ratio of F to B in the solution was 4.4:1. The resulting solution was cooled to a temperature between —5° C. and —10° C. by adding pulverized Dry Ice to the beaker. While this temperature was maintained by additions of pulverized Dry Ice, aqueous sodium nitrite was added over a period of 45 minutes with vigorous stirring (a total of 150 milliliters of a solution containing 70 grams of sodium nitrite). The rate of sodium nitrite addition was the maximum that could be used without liberation of $NO_2$. The material was then allowed to warm to a temperature of 20° C. to assure completion of the diazotization, after which it was cooled to about —25° C. to complete precipitation of the diazonium fluoborate. The precipitate was collected by passing the cooled reaction products through a basket centrifuge fitted with a saran fabric sack. The collected precipitate was washed with ethylene dichloride (250 cc.) and dried about 16 hours at room temperature at a total pressure of from about three to about eight inches of mercury. The precipitate collected was about 192 grams. A sample of the dried precipitate (60 grams) was decomposed to fluorobenzene (19.8 grams). The overall conversion of aniline to fluorobenzene was thus about 66 per cent. The decomposition was accomplished by placing the washed and dried precipitate in a flask fitted with an outlet train passing in sequence through a water-ice slurry, and a sodium hydroxide solution, and thence to a vacuum line. The entire surface of the flask was heated to insure escape of all liquid products, the heating being continued to dull redness. The condensates in the ice and sodium hydroxide traps were combined and the organic material recovered by steam distillation. The organic layer in the distillate was separated and dried over calcium chloride (about 10 grams). Pure fluorobenzene was isolated by a final distillation.

EXAMPLE 2

A procedure similar to that described in Example 1 was employed to convert aniline hydrochloride to fluorobenzene; the principal difference was that diazotization was carried out in a hydrochloric acid solution. Aniline hydrochloride (129.5 grams) was mixed with a hydrochloric acid solution (320 cc. of 37 per cent aqueous acid and 380 cc. of water). Diazotization was accomplished by sodium nitrite additions to the cooled solution as described in Example 1. The diazotization products were allowed to warm to 20° C. to insure completion of the diazotization reaction, and fluoboric acid (produced from boric acid, 136 grams and hydrofluoric acid, 325 grams of a 60 per cent aqueous solution) was added thereto. The acid solution comprised fluoboric acid and excess HF in such proportion that the ratio of F to B was 4.4:1. The solution was then cooled to about —25° C. to complete precipitation of the fluoborate, and the solids were separated and fluorobenzene (54 grams) recovered as described above. This amounts to a 57.5 per cent conversion of the aniline hydrochloride charged to fluorobenzene.

EXAMPLE 3

The procedure of Example 1 was used to produce three other aromatic fluorides (runs 2, 4 and 5 in Table I), and the procedure of Example 2 was used to produce two aromatic fluorides (runs 1 and 3 in Table I). The steps in these preparations and the starting materials and products are summarized in Table I, below.

Table I

| Run | 1 | 2 | 3 | 4 | 5 |
|---|---|---|---|---|---|
| Amine | $NH_3Cl$ / Br (benzene) | $NH_2$ / Br (benzene) | $OCH_3$ / $NH_3Cl$ (benzene) | $OCH_3$ / $NH_2$ (benzene) | $NH_2$ (naphthalene) |
| Diazotization solvent: | | | | | |
| Boric acid (gms.) | | 185 | | 185 | 185 |
| Hydrofluoric (gms.)[1] | | 442 | | 442 | 442 |
| Water (cc.) | 380 | 200 | 380 | 200 | 200 |
| Hydrochloric (cc.) acid[2] | 320 | | 320 | | |
| Ratio of F to B | | 4.4:1 | | 4.4:1 | 4.4:1 |
| Diazotization temperature in °C | —5 to —10 | —5 to —10 | —5 to —10 | —5 to —10 | —5 to —10 |
| Temperature (°C.) to which diazotized amine was warmed after diazotization | 20 | 20 | 20 | 20 | 20 |
| Fluoboric acid precipitation: | | | | | |
| Boric acid (gms.) | 136 | | 136 | | |
| Hydrofluoric (gms.) acid[1] | 325 | | 325 | | |
| Ratio of F to B | 4.4:1 | | 4.4:1 | | |
| Temperature °C. of fluoborate before wheeling | —20 | —20 | —20 | —25 | —25 |
| Product | 1-fluoro-4-bromobenzene | 1-fluoro-4-bromobenzene | p-fluoroanisole | p-fluoroanisole | α-fluoronaphthalene |
| Grams of Product | 99 | 95 | 78 | 92 | 83 |
| Per cent conversion of amine to the fluoride product | 56 | 54 | 62 | 73 | 57 |

[1] Hydrofluoric acid: 60 per cent aqueous.
[2] Hydrochloric acid: 37 per cent aqueous.

Table I shows the suitability of the method of the invention to the production of various aromatic fluorides, whether diazotization is carried out in a solvent that comprises fluoboric acid and excess HF, or whether diazotization is carried out in a solvent that comprises hydrochloric acid and the fluoborate subsequently precipitated with a solution comprising fluoboric acid and excess HF.

EXAMPLE 4

The procedure of Example 1 was also used in the production of aromatic fluorides in comparative studies where all variables were maintained approximately constant except the ratio of HF to $H_3BO_3$ used in preparing the fluoboric acid. The steps in preparations using hydrofluoric as the diazotization solvent, and the starting materials and products are summarized in Table II, below.

Table II

| Run | 6 | 7 |
|---|---|---|
| Amine | OCH₃–C₆H₄–NH₂ | OCH₃–C₆H₄–NH₂ |
| Diazotization solvent: | | |
| Boric acid (gms.) | 185 | 185 |
| Hydrofluoric (gms.) acid | 1,442[1] | 1,501[2] |
| Water (cc.) | 200 | 137 |
| Ratio of F to B | 4.4:1 | 4.0:1 |
| Diazotization temperature °C | −5 to −10 | −5 to −10 |
| Temperature (°C.) to which diazotized amine was warmed after diazotization | 10 | 20 |
| Temperature of fluoborate before wheeling | −20 | −20 |
| Product | 2-fluoro anisole | 2-fluoro anisole |
| Grams of product | 70 | 54 |
| Per cent conversion of amine to the fluoride product | 55.5 | 43 |

[1] Hydrofluoric acid: 60 per cent aqueous.
[2] Hydrofluoric acid: 47 per cent aqueous.

EXAMPLE 5

The procedure of Example 2 was used in the production of aromatic fluorides in comparative studies where all variables were maintained approximately constant except the ratio of HF to H₃BO₃ used in preparing the fluoboric acid. The steps in preparations using hydrochloric acid as the diazotization solvent, and the starting materials and products are summarized in Table III, below, in which run 8 is not in accord with the invention since the ratio of F to B is 3.8:1.

Table III

| Run | 8 | 9 | 10 |
|---|---|---|---|
| Amine | OCH₃–C₆H₃(Cl)–NH₂Cl | OCH₃–C₆H₃(Cl)–NH₂Cl | OCH₃–C₆H₃(Cl)–NH₂Cl |
| Diazotization solvent: | | | |
| Hydrochloric acid (gms.)[1] | 320 | 320 | 320 |
| Water (cc.) | 380 | 380 | 380 |
| Diazotization temperature in °C | −5 to −10 | −5 to −10 | −5 to −10 |
| Temperature (°C.) to which diazotized amine is warmed after diazotization | 20 | 20 | 20 |
| Fluoboric acid precipitation: | | | |
| Boric acid (gms.) | 136 | 136 | 136 |
| Hydrofluoric (gms.) acid[2] | 275 | 300 | 325 |
| Ratio of F to B | 3.8:1 | 4.1:1 | 4.4:1 |
| Temperature of fluoborate before wheeling | −20 | −20 | −20 |
| Product | 4-chloro-2-fluoro anisole | 4-chloro-2-fluoro anisole | 4-chloro-2-fluoro anisole |
| Grams of Product | 34 | 80 | 86 |
| Per cent conversion of amine to the fluoride product | 21.2 | 50 | 53.7 |

[1] Hydrochloric acid: 37 per cent aqueous.
[2] Fluoboric acid: 60 per cent aqueous.

The 4-chloro-2-fluoro anisole produced

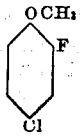

($n_D^{25}$:1.5163; boiling point at 102° C. to 103° C. at 48 mm. of mercury) is believed to be a new compound. From 4-chloro-2-fluoro anisole, by the usual method, 4-chloro-2-fluoro phenol

is produced; 4-chloro-2-fluoro phenol, believed also to be a new compound, has a boiling point of 103° C. to 104° C. at 50 mm. of mercury.

Table III demonstrates clearly the advantage of the method of the invention in that it shows the substantially improved yield which results from carrying out precipitation of the fluoborate with a fluoboric acid solution comprising excess HF.

EXAMPLE 6

The advantage of using a solution comprising fluoboric acid as the diazotization solvent is illustrated by Table IV, below, in which the yields of fluorides (based upon the fluoboric acid used) for the preparations shown in Examples 1 and 2, and for the five runs shown in Table I are reported.

Table IV

| Run | Diazotization Solvent | Percent Yield (based on fluoborate) |
|---|---|---|
| Example 1 | A | 66 |
| Example 2 | B | 26 |
| Example 1 | B | 27 |
| Example 2 | A | 77 |
| Example 3 | B | 28 |
| Example 4 | A | 76 |
| Example 5 | A | 48 |

A—Aqueous solution comprising fluoboric acid.
B—Aqueous solution comprising hydrochloric acid.

It is clear from Table IV that the preferred method of the invention (i. e., carrying out diazotization in a solvent that comprises fluoboric acid and excess HF) requires substantially less fluoboric acid per pound of amine converted to the corresponding fluoride. In runs 1, 3, and Example 2 (where the solvent was hydrochloric acid), the average yield (based on fluoborate) was 27 per cent, whereas in runs 2, 4, 5, and Example 1

(where the solvent was fluoboric acid), the average yield was 67½ per cent.

We claim:
1. A method of producing an aromatic diazonium fluoborate that comprises treating the corresponding primary amine with (a) a nitrite, and (b) an aqueous solution that comprises fluoboric acid and hydrofluoric acid in such relative proportions that the ratio of F to B in the solution is at least 4.1:1 but not greater than 5:1.

2. A method of producing an aromatic diazonium fluoborate that comprises treating the corresponding primary amine, dissolved in an aqueous solution that comprises fluoboric acid and hydrofluoric acid in such relative proportions that the ratio of F to B in the solution is at least 4.1:1 but not greater than 5:1, with a nitrite to produce the diazonium fluoborate.

3. A method as claimed in claim 2 in which the primary amine has the general formula R—$NH_2$ in which R is a haloalkoxy alkaryl radical whereby the alkoxy and alkyl groups have not more than 16 carbon atoms.

JAMES D. HEAD.
FREDERICK J. LOWES.

REFERENCES CITED

The following references are of record in the file of this patent:

FOREIGN PATENTS

| Number | Country | Date |
|---|---|---|
| 600,706 | Germany | July 12, 1934 |

OTHER REFERENCES

Fiat Final Report 998, March 31, 1947, pages 1 to 3.

Mellor, "Inorganic and Theoretical Chemistry," vol. 5, page 124.

Balz et al., Ber. Deutsch. Chem. Gesell., vol. 60B, pages 115 to 118 (1927).

Starkey et al., "Organic Syntheses," vol. 19, pages 40–42 (1939).